United States Patent [19]

Shiba et al.

[11] Patent Number: 4,885,651

[45] Date of Patent: * Dec. 5, 1989

[54] TAPE CASSETTE WITH LOW FRICTION SLIDE MEMBER FOR GUIDING MOVEMENT OF A LID THEREON

[75] Inventors: Haruo Shiba; Masatoshi Okamura; Kenji Hashizume, all of Nagano, Japan

[73] Assignee: TDK Corporation, Japan

[*] Notice: The portion of the term of this patent subsequent to Jan. 5, 2005 has been disclaimed.

[21] Appl. No.: 123,131

[22] Filed: Nov. 20, 1987

Related U.S. Application Data

[63] Continuation-in-part of Ser. No. 795,184, Nov. 5, 1985, Pat. No. 4,717,980.

[30] Foreign Application Priority Data

Nov. 7, 1984 [JP] Japan .................................. 59-169693
Nov. 7, 1984 [JP] Japan .................................. 59-169694

[51] Int. Cl.$^4$ .............................................. G11B 23/08
[52] U.S. Cl. ..................................... 360/132; 242/199
[58] Field of Search ..................... 360/132, 85, 93; 242/197-199; 206/387

[56] References Cited

U.S. PATENT DOCUMENTS

| | | | |
|---|---|---|---|
| 4,418,373 | 11/1983 | Fujimoro et al. | 360/132 |
| 4,556,153 | 12/1985 | Takagi et al. | 206/387 X |
| 4,572,461 | 2/1986 | Horikawa et al. | 360/132 X |
| 4,717,980 | 1/1988 | Shiba et al. | 360/132 |

FOREIGN PATENT DOCUMENTS 58-128070 7/1983 Japan ................................. 360/132

Primary Examiner—John H. Wolff
Attorney, Agent, or Firm—Steinberg & Raskin

[57] ABSTRACT

A tape cassette has a case containing a pair of reels for winding magnetic tape. An outer lid is pivotally mounted on the case to open and close the outside of the passage through which the magnetic tape is stretched along the front of the case. An inner lid is pivotally mounted on the inside of the outer lid to open and close the inside of the passage through which the magnetic tape is stretched. A slide member is formed on the inner lid. A guide groove is formed in the case to guide the slide member. The slide member is made of material different from the edges of the guide groove.

17 Claims, 5 Drawing Sheets

FIG. I

TAPE CASSETTE WITH LOW FRICTION SLIDE MEMBER FOR GUIDING MOVEMENT OF A LID THEREON

CROSS REFERENCE TO RELATED APPLICATION

This application is a continuation-in-part of application Ser. No. 795,184 filed Nov. 5, 1985 now U.S. Pat. No. 4,717,980.

BACKGROUND OF THE INVENTION

The present invention relates to a tape cassette. More particularly, the invention relates to the lid of an 8 mm video tape cassette and the guide member of the lid.

The type of tape cassette of the invention comprises a case containing a pair of reels for winding magnetic tape and members enabling the magnetic tape to be drawn out towards the front of the case while keeping said magnetic tape in a stretched condition. Such members also keep the magnetic tape inserted between the outer lid and the inner lid, so that said magnetic tape may be protected by these lids.

SUMMARY OF THE INVENTION

The principal object of the invention is to provide a tape cassette having reduced frictional resistance between the inner lid and the case for smoother sliding.

An object of the invention is to provide a tape cassette having reduced frictional resistance between the inner lid and the case for simultaneous smoother sliding and prevention of formation of white dust of the synthetic resin for smoother performance of the tape guard device of said tape cassette.

In accordance with the invention, the tape cassette comprises a case containing a pair of reels for winding magnetic tape. An outer lid is pivotally mounted on the case to open and close the outside of the passage through which the magnetic tape is stretched. An inner lid is pivotally mounted on the inside of the outer lid to open and close the inside of the passage through which the magnetic tape is stretched. A slide member is formed on the inner lid and a guide member is formed in the case to guide the slide member. At least the slide member is made of material which is different from the material of the guide member, at least.

In a preferred embodiment of the invention, at least the slide member is made of material having a smaller frictional resistance than that of the guide member, at least.

BRIEF DESCRIPTION OF THE DRAWINGS

For a fuller understanding of the invention, reference is had to the following description, taken in connection with the accompanying drawings, in which.

DESCRIPTION

Figure 1:
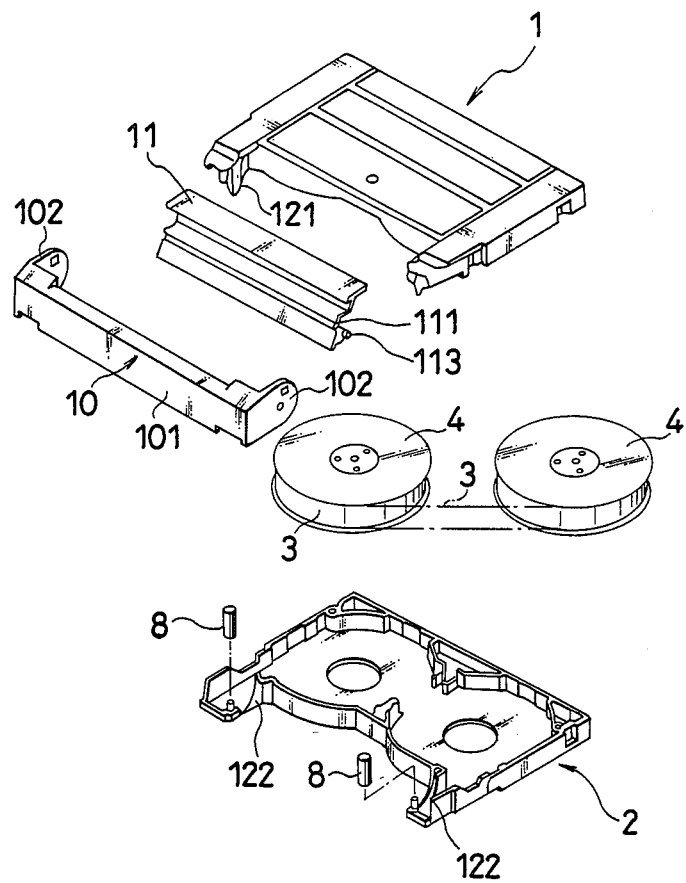
FIG. 1 is an exploded or disassembled perspective view of a known tape cassette of the type of the invention.

The construction of a tape cassette of the type of the invention is explained with reference to FIGS. 1 to 5. In FIG. 1, the case has an upper half 1 and a lower half 2. The upper half 1 and the lower half 2 are made of synthetic resin, such as, for example, ABS (acrynitrilebutadiene styrene) resin, having adequate mechanical strength, moldability and heat resistance, so that they may be combined to constitute the case. The case contains a pair of reels 4, 4 for winding magnetic tape 3. The magnetic tape 3 wound around the reels 4, 4 is positioned to pass openings 6, 6 provided on both sides of the front of the case (FIG. 4), and is drawn out towards the front of the case consisting of the upper half 1 and the lower half 2 within the structure of said case.

Figure 4:
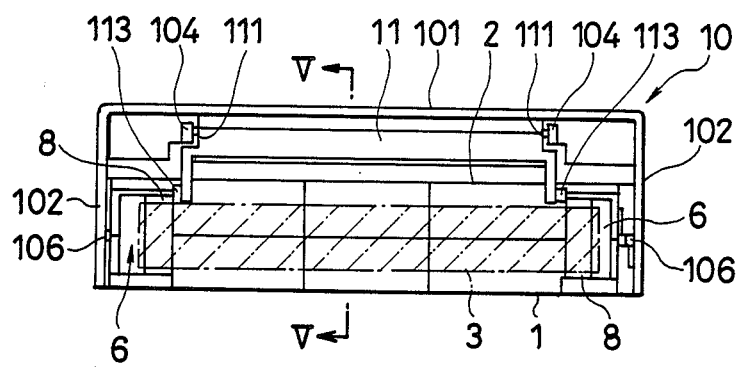
FIG. 4 is a front view, on an enlarged scale, of the tape cassette of FIG. 1, assembled, with the tape loaded on the tape deck.
Figure 5:
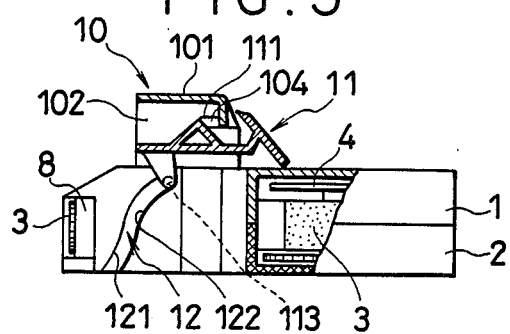
FIG. 5 is a cutaway view, partly in section, taken along the lines V—V, of FIG. 4.

As is clear from the condition of the lower half 2, shown in FIG. 1, the front face of the case is extended frontward while it is recessed in the middle to form a curved surface. As shown in FIGS. 4 and 5, the magnetic tape 3 drawn out through the openings 6, 6 is stretched along the front face of the case while in contact with guide posts 8, 8.

A device consisting of an outer lid 10 and an inner lid 11 is provided to protect the magnetic tape 3. The outer lid 10 is designed so that arms 102, 102 at both ends of protective plate 101 at the front are affixed to the face of the case via pins or shafts 106, 106 projecting into each of said arms. The outer lid 10 functions to open and close the passage for the magnetic tape 3 stretched along the front of the case from outside.

Figure 6:
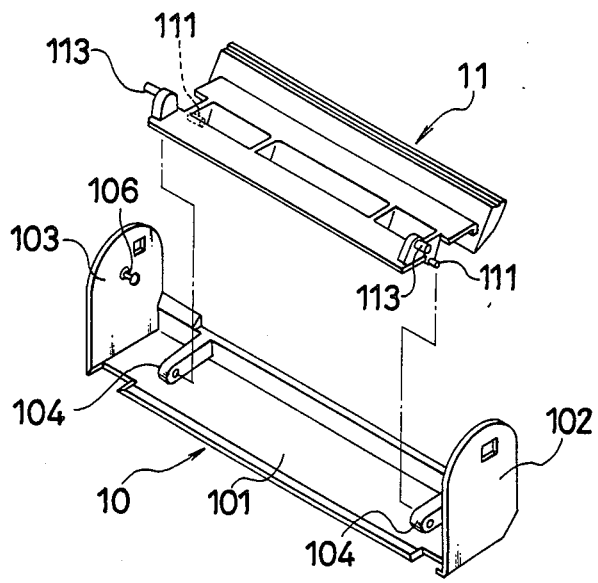
FIG. 6 is a perspective view, on an enlarged scale, showing the relationship of the outer lid and the inner lid of the known tape cassette.

The inner lid 11 is made of a synthetic resin, such as, for example, ABS resin, which is the material of the case. As shown in FIG. 6, pins or shafts 111, 111 are pivotally housed in bearings 104, 104, projecting inside the outer lid 10 at intervals. Furthermore, slide members, i.e. pins or shafts 113, 113 project from the both ends of the inner lid 11 in a longitudinal direction. The pins 113, 113, when made to rotate, are guided along guide members comprising guide grooves 12, 12, and the inner lid 11 turns to open and close the stretching passage of the magnetic tape 3 from inside. The guide grooves 12, 12 are formed approximately in S-shape along one of the outer surfaces of the openings 6, 6.

Figure 7:
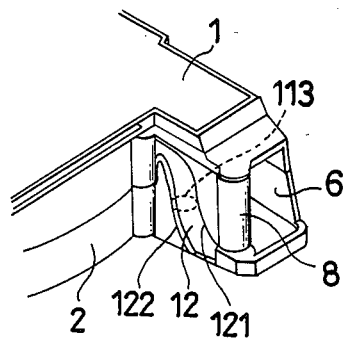
FIG. 7 is a perspective view, on an enlarged scale, of the main parts of an embodiment of the tape cassette of the invention.

As shown in FIGS. 1, 5 and 7, edges 121, 121 constituting one of the edges of the guide grooves 12, 12 are formed in the upper half member 1 and edges 122, 122 are similarly formed in the lower half member 2, so that the guide grooves 12, 12 are formed by joining said upper half member and said lower half member. The guide grooves 12, 12 may, of course, be formed only in the upper half member 1 or the lower half member 2.

Figure 2:
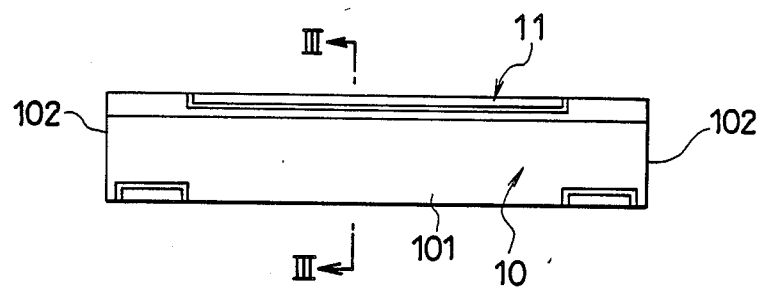
FIG. 2 is a front view, on an enlarged scale, of the tape cassette of FIG. 1, assembled.
Figure 3:
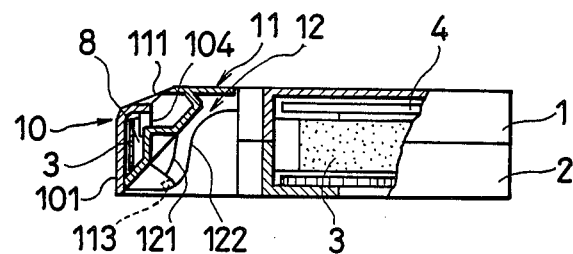
FIG. 3 is a cutaway view, partly in section, taken along the lines III—III, of FIG. 2.

The tape protecting device, consisting of the outer lid 10 and the inner lid 11, is normally closed by a spring lock device (not shown in the Figs.). The magnetic tape 3 stretched along the front face of the case may thus be interposed between the inside face and the outside face (FIGS. 2 and 3). When the tape cassette is loaded on the video deck, said lock device will be released to cause said tape guard device to move above the upper half member 1, and the stretched surface of the magnetic tape 3 will be exposed at the front of the case (Refer to FIGS. 4 and 5).

The inner lid 11 has conventionally been made of synthetic resin, such as, for example, ABS resin, similar to the material of the case. This has resulted in great frictional resistance against sliding between the pins 113, 113 at both ends of said inner lid and the guide grooves 12, 12. This has resulted further in the production of the white dust of the synthetic resin due to the friction of these parts. The end result has been a decrease in performance of the tape protecting device consisting of the outer lid 10 and the inner lid 11. Furthermore, the white dust is deposited on the magnetic tape 3 and contaminates the magnetic-recording surface of said tape, which leads to dropout.

The tape cassette of the invention is described with reference to FIGS. 1 to 7. In the tape cassette of the invention, the case including the upper half 1 and the lower half 2 is made of polystyrene resin, having great mechanical strength, heat resistance and small frictional resistance. On the other hand, the inner lid 11 is made of synthetic resin having less frictional resistance than that of the polystyrene resin. As a result, the frictional resistance between the pins 113, 113 of the inner lid 11 and the guide grooves 12, 12 formed in the case is reduced. This prevents the formation of the white dust, and smoothens the performance of the tape protecting device consisting of the outer lid 10 and said inner lid. The inner lid 11 is preferably made, for example, of polyacetal resin, polycarbonate resin, or polyamide resin (Nylon).

In other words, the guide means of the present invention, i.e. the guiding components or guide grooves 12, are also made of polystyrene resin.

Figure 8:
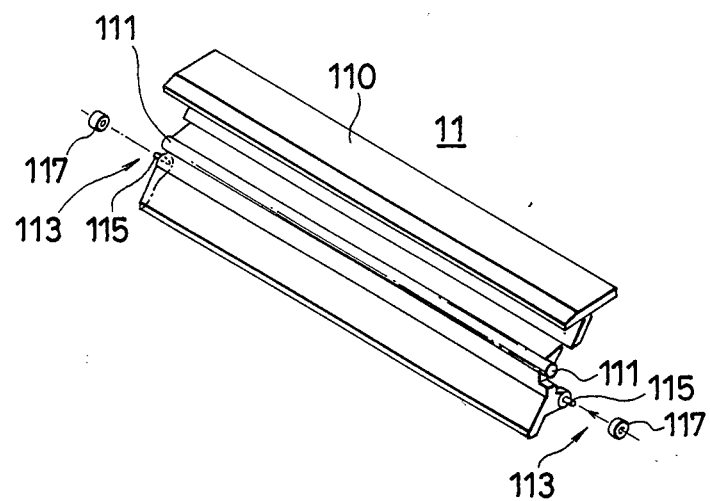
FIG. 8 is a perspective view, on an enlarged scale, of another embodiment of the inner lid of the tape cassette of the invention.

FIG. 8 is a perspective view of another embodiment of the inner lid of the tape cassette of the invention. In the embodiment of FIG. 8, in forming the pins 113, 113 which are to be slidably guided in the grooves 12, 12 of the case (FIGS. 1 through 7), pins 115, 115 are formed on the surfaces of both ends of the inner lid 11, so that said pins 115, 115 are formed in one piece with said inner lid as the projecting parts. In the embodiment of FIG. 8, sleeves 117, 117 are made of material having less frictional resistance than that of the inner lid 11 and are affixed to each of the pins 115, 115.

In the structure illustrated in FIGS. 1 to 7, when the inner lid 11 and the outer lid 10 are combined with the case consisting of the upper half 1 and the lower half 2, the surfaces of the sleeves 117, 117, whose frictional resistance is relatively small, serve as the sliding surfaces in the guide grooves 12, 12. As a result, the frictional resistance of sliding of the pins 113, 113 in the guide grooves 12, 12 is reduced, thereby preventing the formation of the white dust and smoothening the movement of the tape protecting device consisting of the outer lid 10 and the inner lid 11. Thus, when the mechanical strength, heat resistance and moldability of the body of the inner lid 11 are improved by making it of polystyrene resin, for example, the sleeves 117, 117 are preferably made of polyacetal resin, polytetrafluoroethylene resin (Teflon resin), polyamide resin, or metallic material, such as, for example, stainless steel.

In still another embodiment of the invention, the pins 113, 113 are made of the polyacetal resin, Teflon resin, polyamide resin, or metallic material, such as, for example, stainless steel, and the sleeves 117, 117 are not used. The pins 113, 113 may be affixed to the inner lid 11.

The invention is by no means restricted to the aforementioned details which are described only as examples; they may vary within the framework of the invention, as defined in the following claims.

It will thus be seen that the objects set forth above, among those made apparent from the preceding description, are efficiently attained, and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A tape cassette having a case, a magnetic tape in the case, and a pair of reels in the case for winding the magnetic tape, said case having a passage through which the magnetic tape is stretched, said tape cassette comprising an outer lid pivotally mounted on said case to open and close the outside of said passage;

an inner lid pivotally mounted on the inside of said outer lid to open and close the inside of said passage;

a pair of slide members formed on opposite sides of said inner lid; and guide means formed in said case to guide said pair of slide members, said guide means comprising a pair of guiding components with each component situated adjacent a respective slide member with said slide members being made of polyacetal resin, polycarbonate resin, polyamide resin, Teflon resin, or metallic material and said case with said guide means being made of polystyrene resin, whereby white dust formation and contamination of the running tape are prevented.

2. A tape cassette as claimed in claim 1, wherein said slide members are made of material having a frictional resistance different from that of said guide means.

3. A tape cassette as claimed in claim 1, wherein said slide members are made of polyacetal resin.

4. A tape cassette as claimed in claim 1, wherein said slide members are made of polycarbonate resin.

5. A tape cassette as claimed in claim 1, wherein said slide members are made of polyamide resin.

6. A tape cassette as claimed in claim 1, wherein said two slide members are constituted by pins projecting from both sides of said inner lid in a longitudinal direction.

7. The cassette of claim 6, wherein said guide means components are constituted by a pair of guide grooves formed in said casing, each guide groove receiving a respective pin.

8. The cassette of claim 7, wherein said pins are integrally formed with said inner lid.

9. The cassette of claim 7 wherein said guide grooves are each substantially S-shaped.

10. The cassette of claim 9, wherein said casing is formed from matching upper and lower halves, with one edge of each guide groove being formed on said upper half and an opposite edge of said guide groove being formed on said lower half, said casing halves being formed of said polystyrene.

11. A tape cassette as claim in claim 6, wherein said slide members further comprise sleeves affixed to said respective pins projecting from both sides of said inner lid in the longitudinal direction.

12. A tape cassette as claimed in claim 11, wherein said sleeves are made of polyacetal resin.

13. A tape cassette as claimed in claim 11, wherein said sleeves are made of polytetrafluoroethylene resin.

14. A tape cassette as claimed in claim 11, wherein said sleeves are made of polyamide resin.

15. A tape cassette as claimed in claim 11, wherein said sleeves are made of metallic material.

16. A tape cassette as claimed in claim 11, wherein said sleeves are made of stainless steel.

17. The cassette of claim 11, wherein said inner lid and pins are formed of polystyrene resin too.

* * * * *